No. 794,066. Patented July 4, 1905.

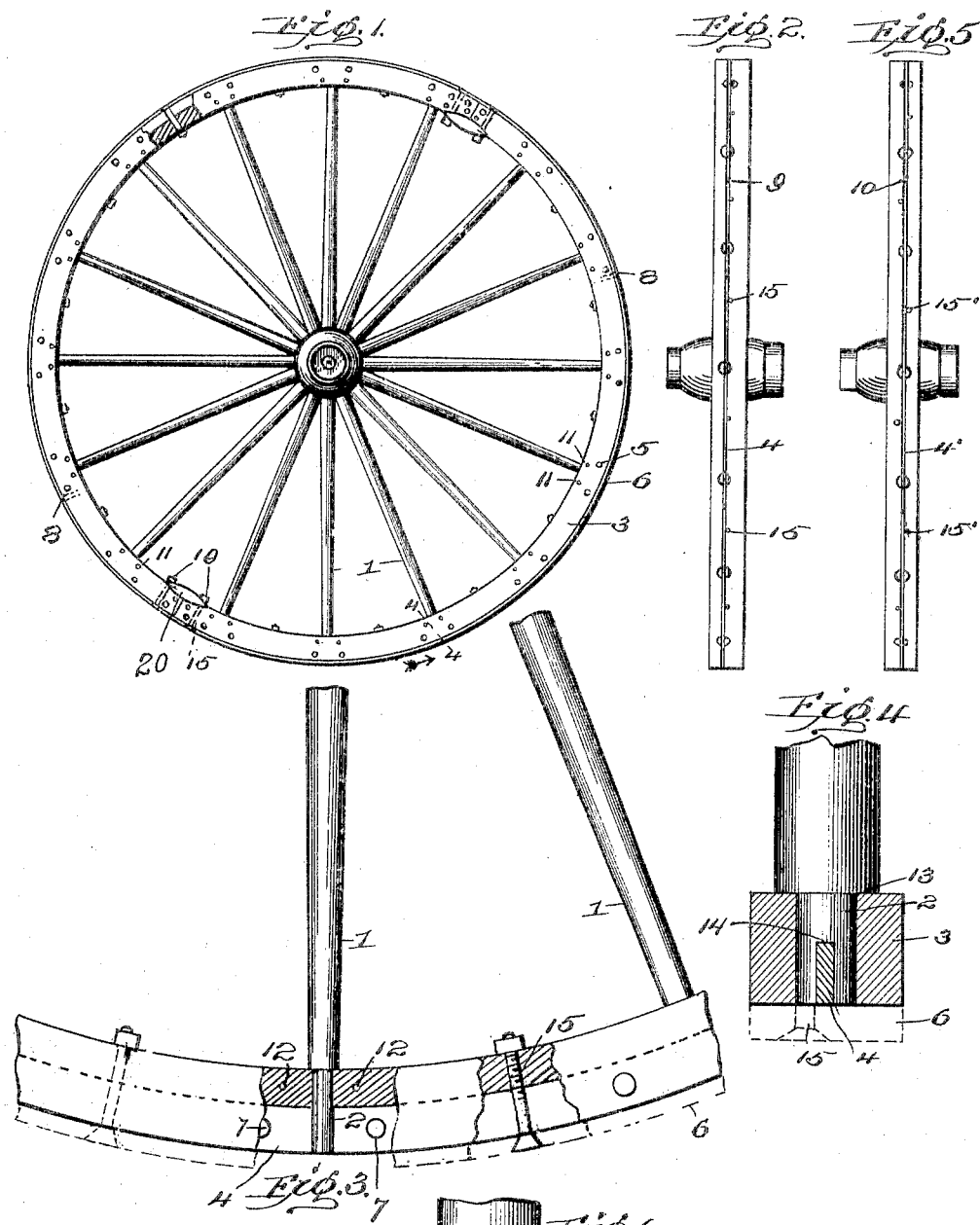

UNITED STATES PATENT OFFICE.

ROBERT P. ABRAHAM, OF LAGRANGE, GEORGIA.

WHEEL.

SPECIFICATION forming part of Letters Patent No. 794,066, dated July 4, 1905.

Application filed February 25, 1905. Serial No. 247,349.

*To all whom it may concern:*

Be it known that I, ROBERT P. ABRAHAM, a citizen of the United States, residing at Lagrange, in the county of Troup and State of Georgia, have invented certain new and useful Improvements in Wheels; and I do hereby declare the following to be a full, clear, and exact description of the invention, such as will enable others skilled in the art to which it appertains to make and use the same.

This invention relates to improvements in wheels, and more particularly to vehicle-wheels.

One of the numerous objects in view is the construction of a wheel which is provided with simple and efficient reinforcing means for the felly thereof.

Another object of the invention is the provision of means positioned within the felly of the wheel for preventing the flattening of the same between the spokes, as well as positively securing all of the parts in an assembled position.

A further object of the invention is the provision of reinforcing means which obviates the liability of the shoulders of the tenons of a wheel being forced into the felly, for the reason that the spokes engage the rim at the shoulder of the tenon and the reinforcing means at the shoulder formed by the slot in each of the tenons. This structure doubles the weight-carrying capacity of the spokes or its power of resistance, at the same time lessening the danger of forcing the shouldered portion of the spokes formed by the tenons into the felly, and consequently of splitting the same.

While I have mentioned some of the objects in view, the invention consists of certain other novel constructions, combinations, and arrangement of parts, as will be hereinafter fully described, illustrated in the accompanying drawings, and more particularly pointed out in the claims hereto appended.

In the drawings, Figure 1 is a view in side elevation of a wheel constructed in accordance with the present invention. Fig. 2 is a view in front elevation of the wheel depicted in Fig. 1. Fig. 3 is a fragmentary view of the wheel depicted in Fig. 1 shown in side elevation and partially in section. Fig. 4 is a section taken on line 4 4, Fig. 1, and looking in the directions of the arrow. Fig. 5 is a view in front elevation of another embodiment of my invention. Fig. 6 is a fragmentary view of a spoke, illustrating another embodiment of the present invention.

Referring to the drawings by numerals, 1 designates spokes of a wheel, which are provided with tenons 2. A felly 3 is positioned upon the tenons 2, said felly being sectional in structure. The felly is provided with a peripheral groove. The tenons 2 are provided with slots. Within the slots of the tenons and the peripheral groove of the felly 3 a sectional band 4 is countersunk. The band 4 comprises segmental members, which are secured together after they are positioned within the peripheral groove and the walls of the tenons by transverse fastening means 5. The transverse fastening means are preferably rivets; but other suitable means may be employed.

In Fig. 1 I have shown a tire 6 positioned upon the felly of a wheel, while in Figs. 2 and 5 the tire is not shown. By reason of the positioning of band 4 within the felly reinforcing means is formed upon the same, which in a certain degree will obviate the necessity of employing a tire 6, although in ordinary cases it is preferable to position the same upon the felly when constructing a completed wheel. The sectional band 4 is provided with apertures 7, within which the transverse securing means 5 are positioned. Of course apertures registering with the apertured portion 7 of the band will also be formed in the felly. As will be seen in Fig. 1 at 8, the segments of the band 4 will be brought close together, but are spaced apart a sufficient distance to allow of a slight expansion and contraction. This sectional structure of the band 4 is also shown at 9 and 10 in both of the Figs. 2 and 5. The transverse securing means 5 are preferably carried by the felly contiguous to and upon opposite sides of each of the tenons. Similarly-positioned screws or rivets or suitable fastening means 11 are also carried by the felly; but said means 11 engage only the the felly or rim 3 and do not, as is the case with the transverse securing means 5, engage the metallic band 4. For accommodating the transverse reinforcing means 11 apertures 12 are formed in the felly contiguous to each tenon-receiving aperture, as will be seen upon referring to Fig. 3.

In the drawings I have shown as my preferred structure the slot formed in the tenon of each of the spokes extending only a part of the length of the tenon, while it will be obvious that the depth of the slot of each of the tenons may be varied without departing from the spirit and scope of the present invention. In the present instance I have shown the band of the same width as the depth of the slot of the tenons.

As heretofore stated, the shouldered portion 13 is formed upon each of the spokes by reason of the tenon structure thereof. The shouldered portions 13 of the spokes engage the felly or rim 3. The bottom 14 of the slotted portion of each tenon also constitutes a shoulder engaging the metallic band 4, constituting reinforcing means. It will be obvious from this structure that two shoulders are formed for sustaining the weight which is brought to bear upon each spoke by this structure. The liability of the destruction of the wheel by the spoke being forced into the felly or rim as the wheel becomes worn is obviated to a great extent. In an ordinary wheel the felly or rim is often dished or flattened between the spokes; but by means of the peculiarly-positioned sectional band 4, constituting the reinforcing means in the felly and the tenons, not only the liability of destroying the original structure of the wheel is obviated, but the minimizing of the elements employed in the wheel is obtained, since, as it has heretofore been stated, the tire 6 may be obviated. The reinforcing means 4 when positioned within the felly of a wheel forms a continuous wearing-surface.

For securing the tire 6 upon the wheel I employ bolts 15. The bolts 15 are preferably positioned upon one side of the metallic band 4 and in engagement with the same. The bolts 15 pass through the tire 6 and felly 3 and are in engagement with the reinforcing means positioned within the felly. In Fig. 2 the bolts 15 are positioned upon one side of the metallic band 4, constituting the reinforcing means for the wheel, while in Fig. 5 the bolts 15' are alternately positioned upon different sides of the metallic band 4'.

Referring to Fig. 6, I have shown a spoke 16 provided with a double tenon structure. Extending from the primary tenon 17 is an auxiliary tenon 18. The auxiliary tenon 18 is provided with a slot of the same depth as the length thereof. Positioned within the slot of the tenon 18 is a band 4ª, which is of the same structure as the band 4 of my preferred embodiment, and said band 4ª is employed for the same purpose as specified for the band 4. A felly 3' is positioned upon a wheel provided with double-tenoned spokes, as depicted in Fig. 6.

The felly or rim 3 is sectional in structure, the sections of the felly being secured together primarily by the reinforcing means 4, countersunk therein. A tire-bolt 15 is secured near each of the ends of each of the sections of the felly, as will be seen upon referring to Fig. 1, the securing of the bolts 15 near the ends of each of the sections producing a pair of bolts 15, which are secured in approximately parallel position. The nuts 19 of the bolts 15 engage an angular plate 20, positioned upon said bolts. The plates 20 reinforce the joints of the felly or rim, thereby materially assisting in producing a simple yet efficient structure.

What I claim is—

1. In a wheel, the combination of spokes, each of said spokes provided with a slotted tenon, a felly positioned upon said spokes, said felly having a peripheral groove, reinforcing means positioned within the slotted portion of said tenons and the groove of said felly, a tire carried by said felly, and means extending through said tire and felly and engaging the reinforcing means.

2. In a wheel, the combination with spokes, a felly having a peripheral groove positioned upon said spokes, segmental members, constituting reinforcing means, positioned within the groove of said felly, and pairs of transverse members positioned upon said felly contiguous to the tenon of each of the spokes, one of said pairs of transverse members engaging said reinforcing means.

3. In a wheel, the combination with a hub, of spokes secured to said hubs, each of said spokes provided with a slotted tenon, a felly having a peripheral groove positioned upon the tenoned portion of said spokes, the peripheral groove of the felly of the same width as the depth of the slots of the tenons, segmental members, constituting a band positioned within the slotted portion of said tenon and the groove of the felly, transverse means contiguous to each of the tenons and upon the felly, a tire positioned upon said felly, and fastening means for said tire carried by said felly and engaging the segmental members.

4. In a wheel, the combination of spokes, provided with tenons, said tenons having a slot, a sectional felly having a peripheral groove positioned upon said spokes, reinforcing means positioned within the slotted portion of said tenons and the groove of the felly, a tire positioned upon said felly, fastening members for said tire, said members extending through the tire and the felly and engaging the sides of the reinforcing means, and transverse securing means carried by said felly and extending parallel to the tire.

5. A wheel, comprising a hub, spokes secured to said hub, each of said spokes provided with a double tenon, a felly positioned upon the tenoned portion of said spokes, each of the tenoned portions of said spokes provided with a slot of the same depth as the length of the outer tenon, said felly provided with a groove of the same depth as the slot of the outer tenons, and reinforcing means positioned within the grooved portion of said felly and the slotted portion of said tenons.

6. A wheel, comprising a hub, spokes secured to said hub, each of said spokes provided with a double tenon, a felly positioned upon the tenoned portion of said spokes, each of the tenoned portions of said spokes provided with a slot of the same depth as the length of the outer tenon, said felly provided with a groove of the same depth as the slot of the outer tenons, and a band countersunk in the slotted portion of said tenons and the groove of said felly.

7. A wheel, comprising a hub, spokes secured to said hub, each of said spokes provided with double tenons, a felly positioned upon the tenoned portion of said spokes, each of the tenoned portions of said spokes provided with a slot of the same depth as the length of the outer tenon, said felly provided with a groove of the same depth as the slot of the outer tenons, and a sectional band countersunk in the slotted portion of said tenons and the groove of said felly.

8. A wheel comprising a hub, spokes secured to said hub, each of said spokes provided with a double tenon, the outer portion of the double tenon having a slot, a grooved felly positioned upon said spokes, and reinforcing means countersunk in the grooved portion of said felly and the slot of said tenons.

9. In a wheel the combination with spokes, of a felly having a peripheral groove mounted upon said spokes, reinforcing means positioned within the groove of said felly, and pairs of transverse members positioned upon said felly contiguous to each of the spokes, one of said pairs of transverse members engaging said reinforcing means.

10. In a wheel the combination with spokes, of a felly having a groove positioned upon said spokes, a band countersunk in said felly, and pairs of transverse members positioned upon said felly contiguous to the spokes, one of said pairs of transverse members engaging said band.

In testimony whereof I affix my signature in presence of two witnesses.

ROBERT P. ABRAHAM.

Witnesses:
S. H. Dunson,
G. M. Edwards.